US00RE38022E

(19) United States
(12) Reissued Patent
De Laforcade

(10) Patent Number: US RE38,022 E
(45) Date of Reissued Patent: Mar. 11, 2003

(54) DISPENSING HEAD

(75) Inventor: Vincent De Laforcade, Rambouillot (FR)

(73) Assignee: L'Oreal, Paris (FR)

(21) Appl. No.: 09/893,490

(22) Filed: Jun. 29, 2001

Related U.S. Patent Documents

Reissue of:
(64) Patent No.: 5,915,597
Issued: Jun. 29, 1999
Appl. No.: 08/773,253
Filed: Dec. 23, 1996

(30) Foreign Application Priority Data

Dec. 22, 1995 (FR) ..... 95 15333

(51) Int. Cl.[7] ..... B67D 5/06
(52) U.S. Cl. ..... 222/182; 222/402.13; 222/402.23
(58) Field of Search ..... 222/182, 402.1, 222/402.13, 402.21, 402.22, 402.23

(56) References Cited

U.S. PATENT DOCUMENTS

| | | | |
|---|---|---|---|
| 3,195,783 | A | 7/1965 | Crowell |
| 3,269,614 | A | 8/1966 | Abplanalp |
| 4,219,135 | A | 8/1980 | Ufferfilge |
| 4,720,046 | A | 1/1988 | Morane |
| 5,137,180 | A | 8/1992 | Kieras |

FOREIGN PATENT DOCUMENTS

| | | |
|---|---|---|
| BE | 682408 | 6/1966 |
| FR | 1398595 | 3/1965 |
| FR | 2710558 | 4/1995 |
| FR | 2592004 | 6/1997 |
| GB | 1105867 | 3/1968 |
| GB | 2196062 | 4/1988 |

*Primary Examiner*—Henry C. Yuen
*Assistant Examiner*—Stephanie Willatt
(74) *Attorney, Agent, or Firm*—Finnegan, Henderson, Farabow, Garrett & Dunner, L.L.P.

(57) ABSTRACT

A dispensing head for dispensing a product of liquid to viscous consistency. The head has a fixed part (10) fixed on a dispenser reservoir (3) and a movable part (4) separated from the fixed part by a peripheral cutout and connected thereto in a pivotable manner by a hinge zone (7). The movable part has a connector with a free end (11a) to cause the movable part (4) to communicate with the dispenser valve (2) and actuate the opening of the latter. The cutout (9) is situated substantially between the hinge zone and the fixed part (10), and is situated in a plane perpendicular to an axis of the connector in a position substantially corresponding to the position of the free end (11a) of the connector.

72 Claims, 3 Drawing Sheets

DISPENSING HEAD

Matter enclosed in heavy brackets [ ] appears in the original patent but forms no part of this reissue specification; matter printed in italics indicates the additions made by reissue.

BACKGROUND OF THE INVENTION

The invention relates to a head for the dispensing of a product in a liquid form with a relatively viscous consistency, having a particularly compact shape, and also relates to a dispenser comprising this head. This dispenser may be used in various fields of application and may serve for the dispensing of cosmetic products (a lacquer, a deodorant, a hair mousse, a body lotion, a depilatory foam liquid foundation, or a sunscreen lotion) or dermopharmaceutical products (an insect repellant, analgesic or anti-inflammatory product), household products, paints, etc. in the form of liquids, gels, sprays or foams.

As is known the dispenser of the invention comprises a reservoir containing the product, provided with a dispensing valve equipped with an actuating means, such as an actuating stem, and having a longitudinal axis of symmetry; and a dispensing head comprising a movable part, such as a push button provided with a connecting means for causing the movable part to communicate with the valve and to actuate the opening of the letter. This connecting means is capable of acting on the actuating means of the valve. The movable part comprises, moreover, a conduit transversing the connecting means and connecting one end of the actuating means to a dispensing opening provided in the movable part. The head comprises, moreover, a fixed part such as a retaining ring capable of being fixed on the reservoir and provided for holding the movable part in position. The movable and fixed parts are separated by a peripheral cutout and pivotally connected by a hinge zone.

In general, when a valve with an emergent stem is used the connecting means is constituted by a pin joined to the movable part, capable of cooperating with the valve stem.

A dispenser of this kind has been described by the Applicant in FR-A-2 592 004. The dispensing head of this dispenser is obtained in a single piece and comprises a push button provided with the dispensing opening, and connected to a fixing ring in a pivotable manner, by a film hinge.

The Applicant has found that the dispensing head, and consequently the dispenser according to FR-A-2 592 004, is of a relatively great height. Because of this, the storage and packing of this type of dispenser require a great deal of space.

SUMMARY OF THE INVENTION

The principal object of the present invention is to improve the dispensers of the kind defined above, by reducing their total volume. Moreover, the invention aims to reduce the quantity of raw material required for the manufacture of the head. Moreover, thanks to the invention, it is possible to obtain dispensing heads with a particularly attractive appearance.

These objects are attained by creating a dispensing head of the above described kind, and by reducing the height of the dispensing head. A particular object of the invention is to obtain as low an implantation of the fixed part of the dispensing head on the reservoir as possible.

A first aspect of the present invention provides a head for the dispensing of a product of a liquid to viscous consistency, intended to be mounted on a reservoir which contains the product and is provided with a dispensing valve and has a longitudinal axis, this head comprising, in particular, a fixed part capable of being fixed on the reservoir, and a movable part, said parts being separated by a peripheral cutout and pivotably connected at a hinge zone; and a connecting means having a free end for causing the movable part to communicate with the valve and to actuate the opening of the valve, this head comprising, moreover, a dispensing opening provided with a central axis. It is characterized in that the cutout is situated substantially between the hinge zone and the fixed part; and in that the hinge zone is situated in a position perpendicular to the longitudinal axis corresponding substantially to the position of the free end along the longitudinal axis.

A second aspect of the present invention provides an improved dispenser for the dispensing of a product of a liquid to viscous consistency, having a longitudinal axis and comprising the dispensing head of the first aspect, mounted on the product reservoir provided with a dispensing valve.

Advantageously, the hinge zone is situated between the opening and the fixed part. In a first preferred embodiment, the cutout has a median portion substantially perpendicular to the axis and two end branches ending on either side of the hinge zone, inclined relative to the median portion, ending on either side of the hinge zone. Thus in a preferred embodiment of the invention, an angle $\alpha$ is formed between each branch and the median portion of the cutout. The angle $\alpha$ is typically from 70° to 160°. Preferably, this angle $\alpha$ is an obtuse angle. By means of this arrangement, the median portion of the cutout is situated on the side of the reservoir at a level lower than the hinge zone.

In a second embodiment the cutout has, along the longitudinal and central axes, a profile comprising a bent portion, the profile decreasing from an end situated in the vicinity of the hinge zone as far as an end on the opposite side to the hinge zone. Thus the cutout has an inclined cross-section, so that the point of this cutout nearest to the reservoir is situated on the side diametrically opposed to the opening, that is to say, at the place where the user is pressing to actuate the valve.

In another embodiment, the cutout has an inclined rectilinear profile along the longitudinal and central axes, the profile decreasing from an end situated in the vicinity of the hinge zone as far as an end on the opposite side to the hinge zone.

The valve that can be used for equipping the dispenser in accordance with the invention is advantageously a conventional depression valve. This valve may be a male valve comprising an emergent actuating stem communicating with the dispensing opening via a connecting pin of the movable part. It is also possible to use a female valve without a stem; in this case, the stem is joined to the movable part in communication with this valve.

The movable part advantageously takes the form of a flattened domed cap, performing the function of a push button capable of actuating the opening of the valve via the stem. The top of the cap is formed, for example, by an inclined plane constituting a bearing surface on which the user places his index finger with a view to effecting the dispensing of a product dose. Advantageously, this push button comprises a conduit for passing the product towards the dispensing opening. This conduit has two segments as extension of one another, respectively defining an axial duct and a radial duct bent relative to one another and forming between them an obtuse angle $\beta$. Advantageously, the axial duct of this conduit is formed by a hollow central pin carried by the internal face of the push button capable of being connected to the valve stem. Thus, according to an important aspect of the invention, the central pin has a height along the longitudinal axis, such that its free end is situated substantially at the same level as the hinge zone. When the product to be dispensed is a liquid the dispensing opening may, if required, be provided with a spraying nozzle.

The fixed part is preferably constituted by a cylindrical ring of a low height, advantageously less than 1.5 mm, mounted, for instance, by catch-engagement on the reservoir. This catch-engagement is effected, for example, on a crimped bead of a valve carrier cup surmounting the reservoir. Advantageously, the dispensing valve is fixed in the valve carrier cup, for example also by crimping.

The fixed part carries an extension, for example of a trapezoidal shape, the large base of the trapezium whereof is joined to the fixed part, this extension being turned towards the opposite side to the reservoir. The small base of the trapezium forms, in particular, the pivoting axis of the hinge zone and is advantageously orientated perpendicularly to the axis of the reservoir. The two lateral sides of the trapezium thus converging towards the hinge zone are delimited by two inclined branches of a cutout separating the movable part from the fixed part. The ends of the branches on the opposite side to the hinge zone open out in a median portion of the cutout. This median portion is orientated substantially perpendicularly to the axis of the reservoir, and is situated on the circumference of the movable part. This median portion of the cutout has, in particular, the shape of a circular arc. This cutout allows the movable part to pivot relative to the fixed part round the axis of the hinge zone.

This hinge zone, by means of which the movable part is connected to the fixed part, is preferably situated in a plane passing through the axis of the reservoir and the central axis of the dispensing opening. According to the invention, this hinge zone is situated at a level along the axis of the reservoir corresponding substantially to the level of the connecting means. More particularly, the connecting means is constituted by the valve stem and the pin of the movable part. In particular, the level of the hinge zone is situated exactly at the height of the emergent end of the valve stem. The hinge zone may be constituted by two pivot pins orientated perpendicularly to the axis of the reservoir and carried by the movable part, these pivot pins cooperating with two complementary cylindrical bores carried by the fixed part of the dispensing head. However, the hinge zone is preferably a film hinge formed by a portion of a flexible material of smaller thickness than the rest of the material forming of the movable part.

The dispensing head thus constituted then forms a monobloc assembly (fixed part-movable part and film hinge). From the industrial point of view, this monobloc embodiment permits easy moulding, only requiring low costs for assembling the head on the reservoir.

When the hinge zone is situated substantially at the level of the connecting means, any deformation of the stem is avoided during its actuation, which would risk making it fragile and/or blocking its axial movement.

BRIEF DESCRIPTION OF THE DRAWINGS

To render the present invention more readily understood, an embodiment represented in the attached drawings will be described by way of a purely illustrative example which is in no way restrictive.

DESCRIPTION OF THE PREFERRED EMBODIMENTS

Figure 1:
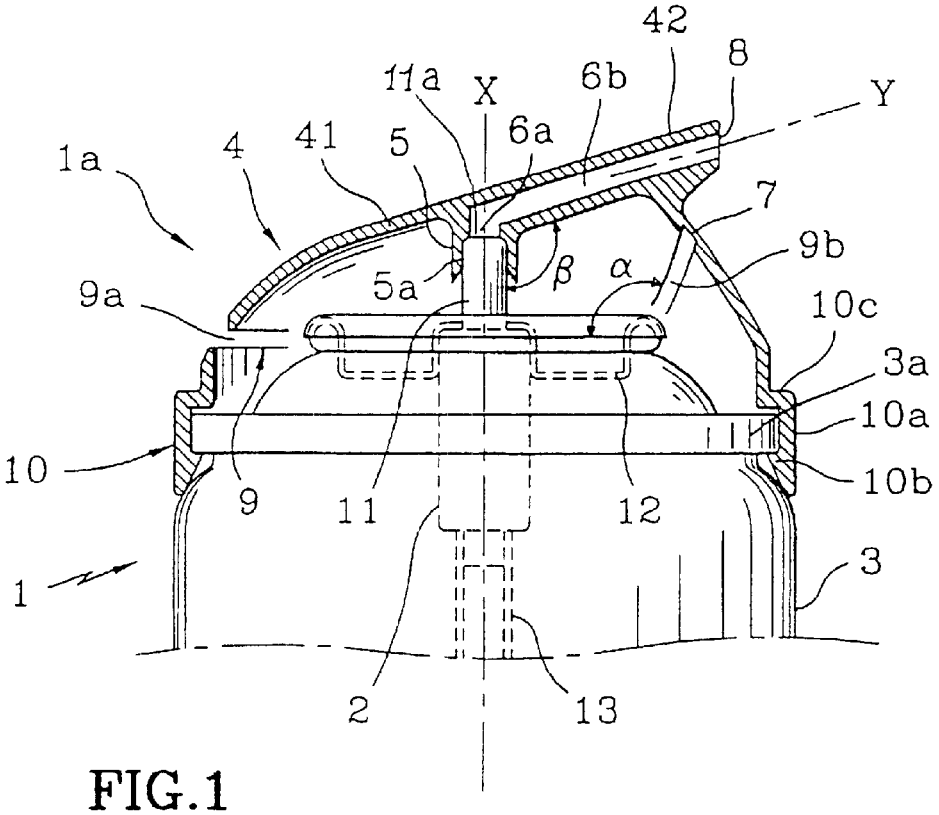
FIG. 1 is a partial axial section of a dispenser in accordance with the invention, in its rest position.

Referring to the attached FIGS. 1 to 5, there may be seen a dispenser for a liquid product, which has been designated as a whole by the reference numeral 1. The dispenser 1 has a valve carrier cup 12, wherein there is crimped a dispensing valve 2 equipping a generally cylindrical reservoir 3, pressurized by means of a propellant gas and having a longitudinal axis X of symmetry. The reservoir 3 contains, for example, a liquid cosmetic or dermo-pharmaceutical product to be dispensed in the form of a filiform jet, a spray or a foam. If required, it is possible to use a reservoir provided with a pouch for the product, connected to the valve or fitted with a piston and acted on by a propellant means such as a propellant gas or a spring.

The dispenser 1 comprises a dispensing head 1a formed by a push button 4 and by a cylindrical retaining ring 10. The push button has the shape of a skull cap or circular dome whose top forms an inclined flat portion 41. The push button and the ring 10 are made from one and the same piece, a flexible film hinge zone 7 being provided for connecting the two. The ring 10 has a cylindrical skirt 10a provided internally by a catch-engagement bead 10b intended to be fixed on a circumferential flange 3a carried by the container 3. The skirt 10 has an annular flat portion 10c situated above the bead 10b and joined to the push button 4. A cylindrical and hollow axial pin 5, joined to the flat portion 41 of the push button 4, is arranged inside the push button. The flat portion 41 of the push button constitutes a bearing surface whereon the user exerts pressure to start the dispensing of the product.

To ensure the mobility of the push button relative to the ring 10, a circular arc-shaped peripheral cutout 9 separates the push button 4 from the ring 10. The cutout 9 is obtained in the side wall of the dome 4, in the vicinity of the plate 10c. This cutout has a circular arc-shaped portion 9a, perpendicular to the axis X, which extends over a peripheral range of approximately 240° and whose ends bear the reference numerals 9d and 9e. These ends 9d, 9e are respectively connected to a branch 9b and 9c of the cutout, so that an angle $\alpha$ is formed between each branch 9b and 9c respectively and the portion 9a. This angle $\alpha$ is approximately 120°. Thus the branches 9b, 9c define the lateral sides of a trapezoidal zone 14 having a large base 14a on the side of the reservoir, and a small base 7 on the opposite side (see FIG. 5). The small base 7 is a flexible zone with a reduced thickness, as compared with the rest of the wall of the dome, and forms the film hinge (FIG. 1). Thus the push button is mounted for pivoting, relative to the ring 10, round the axis of the hinge zone 7. The base 14a is situated in the continuation of the arc shaped portion 9a and in the same plane. As for the film hinge, it is situated in a plane perpendicular to the axis X and arranged approximately halfway between the dispensing opening 8 and the arc shaped portion 9a of the cutout. The opening 8 is provided in an extension 42 of the push button with a central axis Y. The plane of the film hinge passes, moreover, through the free end 11a of the valve stem.

The pin 5 is traversed by an axial duct 6a of a routing conduit which is connected to a transverse or radial duct 6b leading to the dispensing opening 8. The transverse duct 6b and the opening 8 with a central axis Y forms an obtuse angle β with the axis X of the reservoir 3. The free end [11a] of the pin 5 has a bore with a diameter larger than that of the conduit 6a, so as to form a recess 5a capable of receiving with a light grip the free end of an actuating stem 11 of the valve 2. By means of this arrangement in accordance with the invention, the film hinge 7 is, on the one hand, situated substantially at the same height along the axis X as the free end 11a of the valve stem. On the other hand, the cutout 9 is entirely situated at a lower level along the axis X than that of the film hinge 7.

The container 3 is, moreover, surmounted by a valve carrier cup 12 fixed on the latter by the flange 3a. In the cup 12, the dispensing valve 2 comprising the said actuating stem 11 emerging from the cup is fixed, for example by crimping. On the opposite side to the stem 11, the valve is connected to a dip tube 13 permanently dipping into the product to be dispensed.

Figure 2:
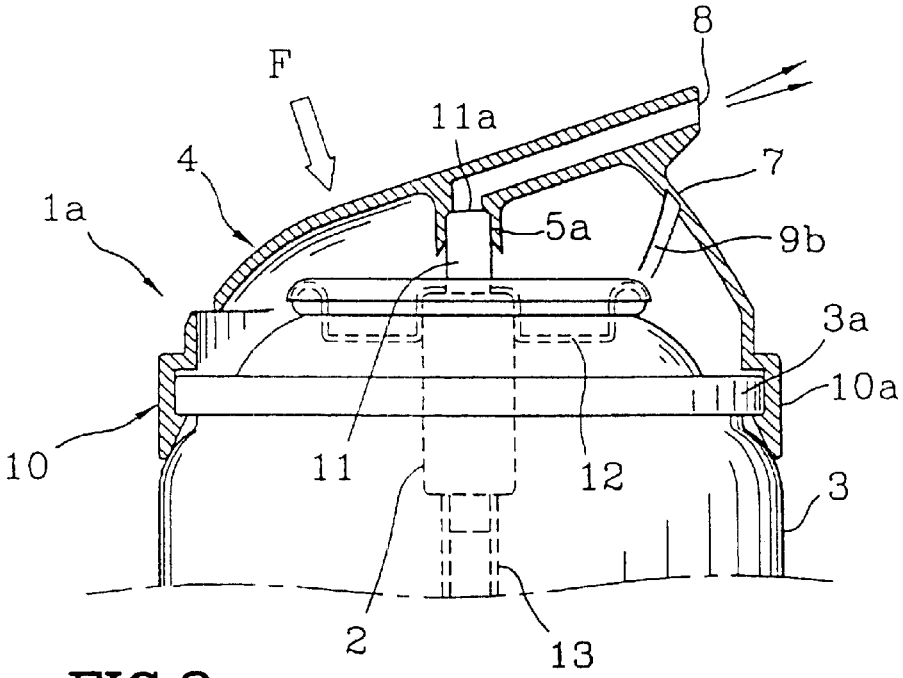
FIG. 2 is a partial axial section of the dispenser of FIG. 1 in the course of the dispensing.
Figure 3:
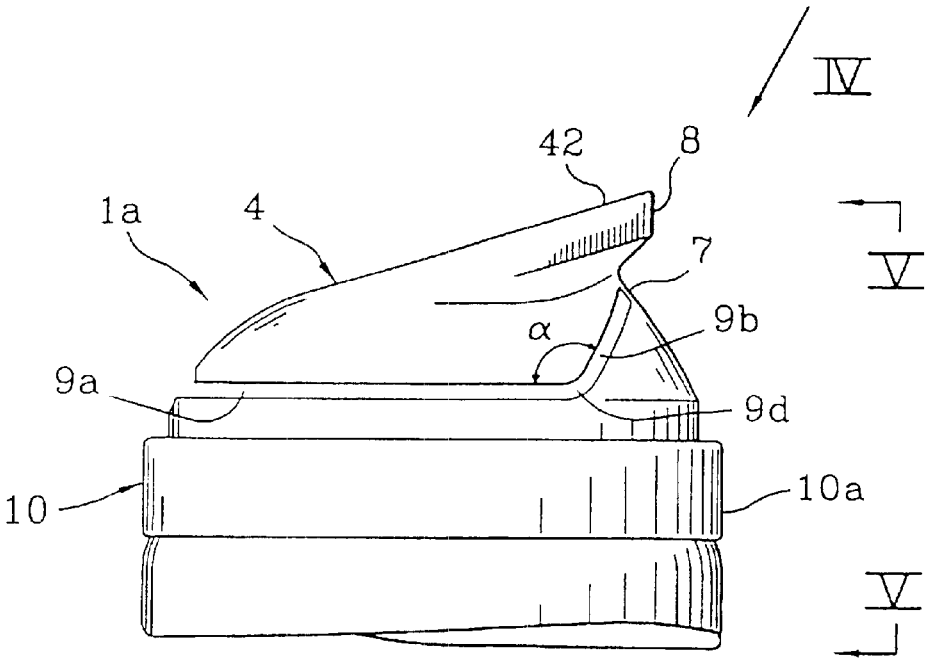
FIG. 3 is a partial side view of the dispenser of FIG. 1 shown in perspective.
Figure 4:
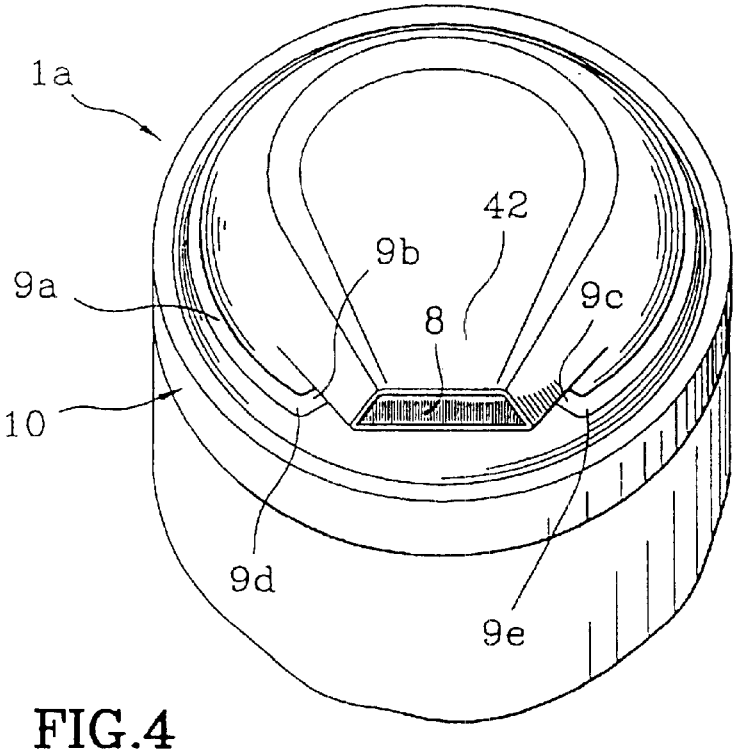
FIG. 4 shows a top view in perspective along line IV—IV of FIG. 3.
Figure 5:
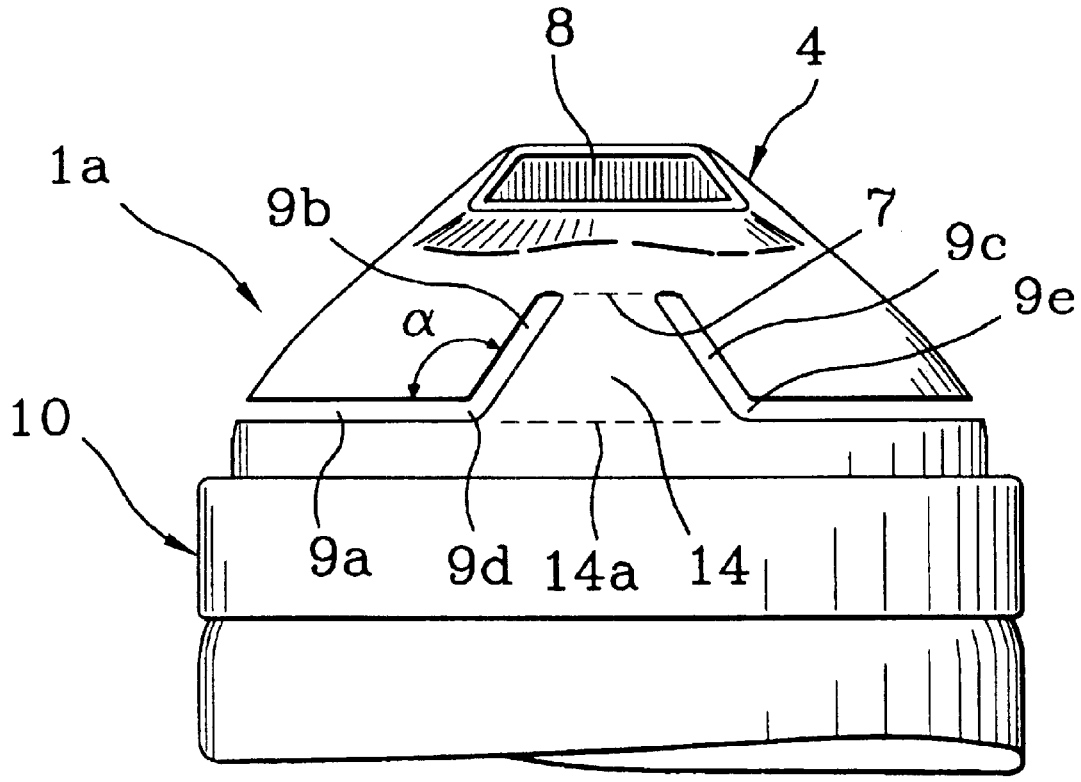
FIG. 5 shows a front view in perspective of the dispensing head of the invention along line V—V of FIG. 3.

The valve 2 is of the conventional "depression" type opening of which is actuated by the depression of the stem 11 in the direction of the axis X towards the bottom of the reservoir. More particularly, the depression of the stem 11 is actuated by the user who starts the dispensing of the product by depressing the plate 41 of the push button in the direction of arrow F (FIG. 2).

It shall be duly understood that the embodiment described above is in no way restrictive and may give rise to any type of desirable modifications. Thus the branches 9b, 9c connected to the portion 9a of the cutout 9 may take the shape of curves, circular arcs, or have another non-rectilinear shape. The profile of the cutout along a plane defined by the axes X and Y may decrease from one end situated in the vicinity of the hinge zone, as far as the opposite end of the hinge zone. In this case, the profile may be rectilinear.

I claim:

1. A head for the dispensing of a product of a liquid to viscous consistency, provided with a dispensing valve (2) and having a longitudinal axis (X), this head comprising a fixed part (10) capable of being fixed on a reservoir (3) containing the product, and a movable part (4) separated by a peripheral cutout (9) and connected for pivoting round a hinge zone (7); a connecting means (11) having a free end (11a) for causing the movable part (4) to communicate with the valve (2) and actuate the opening of the valve, this head comprising a dispensing opening (8) provided with an axis (Y); wherein the cutout (9) is situated substantially between the hinge zone and the fixed part (10); and in that the hinge zone is situated in a plane perpendicular to the axis (X) at a position substantially corresponding to the position of the said free end (11a) along the axis (X).

2. A dispensing head according to claim 1, wherein the cutout (9) has a median portion (9a) substantially perpendicular to the axis (X) and two end branches (9b, 9c) which are inclined relative to the median portion (9a) and end on either side of the hinge zone (7), the branches (9a, 9b) being shaped in such a way that an angle (α) is formed between each branch (9b, 9c) and the median portion (9a) of the cutout.

3. A dispensing head according to claim 2, wherein the angle (α) is from 70° to 160°.

4. A dispensing head according to claim 3, wherein the angle (α) is an obtuse angle.

5. A dispensing head according to claim 2 wherein the median portion (9a) of the cutout (9) has the shape of a circular arc.

6. A dispensing head according to claim 1 wherein the fixed portion is formed by a cylindrical ring (10).

7. A dispensing head according to [any one of] claim 1 wherein the fixed part and the movable part (4) are made of one piece.

8. A dispensing head according to claim 1 wherein the hinge zone is a film hinge (7).

9. A dispensing head according to claim 1, wherein the hinge zone (7) passes through a plane defined by the axis (X) and an axis (Y) passing through the opening (8).

10. A dispensing head according to claim 9, wherein an obtuse angle β is formed between the axes (X) and (Y).

11. The dispensing head of claim 1, wherein said cutout comprises an arcuate portion entirely in a plane that is perpendicular to the axis (X), the plane of said arcuate portion being closer to a lip of said fixed part that is for being fixed on the reservoir than said plane of said hinge zone.

12. A dispensing head according to claim 1, wherein in a plane defined by the axes (X) and (Y), the profile of the cutout (9) has a bent portion, said profile decreasing from an end situated in the vicinity of the hinge zone as far as an end of the opposite side to the hinge zone.

13. A dispensing head according to claim 1, wherein in a plane defined by the axes (X) and (Y), the profile of the cutout (9) has an inclined rectilinear portion, said profile decreasing from an end situated in the vicinity of the hinge zone as far as an end of the opposite side to the hinge zone.

14. A dispensing head according to claim 1, wherein the movable part (4) is dome shaped.

15. A dispenser (1) for the dispensing of a product of a liquid to viscous consistency comprising:

a reservoir (3) containing the product, provided with a dispensing valve (2) and having a longitudinal axis (X);

a dispensing head consisting of a fixed part (10) fixed on the reservoir (3) and a movable part (4) separated by a peripheral cutout and connected in a pivotable manner by a hinge zone (7), a connecting means (11) having a free end (11a) to cause the movable part (4) to communicate with the valve (2) and actuate the opening of the valve, this head comprising, moreover, a dispensing opening (8) provided with an axis (Y), the profile of the cutout (9), in a plane defined by the axes (X) and (Y), decreasing in a direction away from the hinge end; wherein the cutout (9) is situated substantially between the hinge zone and the fixed part (1), and in that the hinge zone is situated in a plane perpendicular to the axis (X) at a position substantially corresponding to the position of the said free end (11a) along the axis (X).

16. A dispenser according to claim 15, wherein the cutout (9) has a median portion (9a) substantially perpendicular to the axis (X) and two end branches (9b, 9c) inclined relative to the median portion (9a) and ending on either side of the hinge zone (7), the branches (9a, 9b) being shaped so that an angle (α) is formed between each branch (9b, 9c) and the median portion (9a) of the cutout.

17. A dispenser according to claim 15, wherein the valve (2) is a depression valve.

18. A dispenser according to claim 15, wherein the angle (α) is an angle of from 70° to 160°.

19. A dispenser according to claim 15, wherein the connecting means is formed by an emergent valve stem (11) and an axial pin (5) cooperating with the stem.

20. A dispensing head for a dispenser having a reservoir with a dispensing valve, the dispensing head comprising:

a fixed part having a lower lip for being attached to the reservoir of the dispenser;

a movable part spaced from said fixed part by a peripheral cutout except at a hinge zone that pivotably attaches said movable part to said fixed part; and a dispensing passageway in said movable part, said passageway having a dispensing opening with a dispensing axis and an interior opening that is for being connected to the dispensing valve of the dispenser and for operating the dispensing valve, said interior opening having a longitudinal axis for being aligned with an axis of the dispensing valve and a seat for receiving an end of the dispensing valve when the dispensing head is mounted on the dispenser, wherein said hinge zone is entirely in a first plane that is perpendicular to said longitudinal axis of said interior opening and that is coplanar with a plane of said seat when said movable part is not depressed *and said cutout is situated entirely below said first plane.*

21. The dispensing head of claim 20, wherein said cutout comprises an arcuate portion entirely in a second plane that is perpendicular to said longitudinal axis of said interior opening and spaced from said first plane, and two linear branch portions at ends of said arcuate portion that extend said cutout from said second plane to said first plane, a gap between said two branch portions at said first plane defining said hinge zone.

22. The dispensing head of claim 21, wherein said two branch portions are two opposite slanted sides of a trapezoid and said first plane is a short side of the trapezoid and said second plane is an opposing long side of the trapezoid.

23. The dispensing head of claim 20, wherein said cutout comprises an arcuate portion entirely in a second plane that is perpendicular to said longitudinal axis of said interior opening, said second plane being closer to said lower lip than said first plane.

24. The dispensing head of claim 20, wherein said fixed part and said movable part have respective exterior side contours that together form a continuous curved side surface so that said fixed and movable parts are visually indistinguishable, except for said cutout therebetween.

*25. A dispensing head for a dispenser having a reservoir and a dispensing valve that has a longitudinal axis, the dispensing head comprising:*

*a fixed part;*

*a movable part spaced from said fixed part by a cutout;*

*a hinge pivotally coupling said fixed part to said movable part;*

*a dispensing passageway in said movable part, said dispensing passageway having a dispensing opening and an interior opening, the interior opening being adapted to receive the dispensing valve of the dispenser to permit operation of the dispensing valve upon movement of said moveable part about said hinge, and*

*wherein at least a substantial portion of said cutout is located below a first plane that both is perpendicular to the longitudinal axis of said dispensing valve when said dispensing head is connected to said valve and passes through said hinge.*

*26. A dispensing head of claim 25, wherein said cutout has a main portion located below said first plane and said cutout has two end branches, one of the end branches being located at either end of said main portion on opposite sides of said hinge, the end branches each being inclined from said main portion upward toward said first plane.*

*27. A dispensing head according to claim 26, wherein an angle α is formed between each end branch and said main portion of said cutout.*

*28. A dispensing head of claim 27, wherein said angle α is from 70 degrees to 160 degrees.*

*29. A dispensing head of claim 27, wherein said angle α is an obtuse angle.*

*30. A dispensing head of claim 27, wherein said main portion of said cutout has the shape of a circular arc.*

*31. A dispensing head of claim 25, wherein said fixed portion is formed by a cylindrical ring.*

*32. A dispensing head of claim 25, wherein said fixed part and said movable part are made of one piece.*

*33. A dispensing head of claim 25, wherein said hinge includes a film hinge.*

*34. A dispensing head of claim 25, wherein said hinge passes through a plane defined by said axis of said dispensing valve and said dispensing opening.*

*35. A dispensing head of claim 26, wherein said main portion of said cutout is located in a second plane that is located below and parallel to said first plane.*

*36. A dispensing head of claim 26, wherein said end branches are two opposite slanted sides of a trapezoid having a short side that lies in said first plane.*

*37. A dispensing head for a dispenser having a reservoir and a dispensing valve that has a longitudinal axis, the dispensing head comprising:*

*a fixed part;*

*a movable part spaced from said fixed part by a cutout;*

*a hinge pivotally coupling said fixed part to said movable part;*

*a dispensing passageway in said movable part, said dispensing passageway having a dispensing opening and an interior opening, the interior opening being adapted to receive the dispensing valve of the dispenser to permit operation of the dispensing valve upon movement of said moveable part about said hinge, and*

*wherein at least a substantial portion of said cutout lies below a first plane that is both perpendicular to the longitudinal axis of said dispensing valve when said dispensing head is connected to said valve and passes through said hinge, and wherein the position of the top of the dispensing valve substantially corresponds to the position of said first plane when said dispensing valve is connected to said dispensing head.*

*38. A dispensing head of claim 37, wherein said cutout has a main portion located below said first plane and said cutout has two end branches, one of the end branches being located at either end of said main portion on opposite sides of said hinge, the end branches each being inclined from said main portion upward toward said first plane.*

*39. A dispensing head according to claim 38, wherein an angle α is formed between each end branch and said main portion of said cutout.*

*40. A dispensing head of claim 39, wherein said angle α is from 70 degrees to 160 degrees.*

*41. A dispensing head of claim 39, wherein said angle α is an obtuse angle.*

*42. A dispensing head of claim 39, wherein said main portion of said cutout has the shape of a circular arc.*

*43. A dispensing head of claim 37, wherein said fixed portion is formed by a cylindrical ring.*

*44. A dispensing head of claim 37, wherein said fixed part and said movable part are made of one piece.*

*45. A dispensing head of claim 37, wherein said hinge includes a film hinge.*

*46. A dispensing head of claim 37, wherein said hinge passes through a plane defined by said axis of said dispensing valve and said dispensing opening.*

*47. A dispensing head of claim 38, wherein said main portion of said cutout is located in a second plane that is located below and parallel to said first plane.*

*48. A dispensing head of claim 38, wherein said end branches are two opposite slanted sides of a trapezoid having a short side that lies in said first plane.*

*49. A dispensing head for a dispenser having a reservoir and a dispensing valve that has a longitudinal axis, the dispensing head comprising:*

*a fixed part;*

*a movable part spaced from said fixed part by a cutout;*

*a hinge pivotally coupling said fixed part to said movable part;*

*a dispensing passageway in said movable part, said dispensing passageway having a dispensing opening and an interior opening, the interior opening being adapted to receive the dispensing valve of the dispenser to permit operation of the dispensing valve upon movement of said moveable part about said hinge, and*

*wherein at least a substantial portion of said cutout lies below a first plane that is both perpendicular to the longitudinal axis of said dispensing valve when said dispensing head is connected to said valve and passes through said hinge, and wherein said cutout has a non-linear profile when viewed from a side of said hinge.*

*50. A dispensing head of claim 49, wherein said cutout has a main portion located below said first plane and said cutout has two end branches, one of the end branches being located at either end of said main portion on opposite sides of said hinge, the end branches each being inclined from said main portion upward toward said first plane.*

*51. A dispensing head according to claim 50, wherein an angle α is formed between each end branch and said main portion of said cutout.*

*52. A dispensing head of claim 51, wherein said angle α is from 70 degrees to 160 degrees.*

*53. A dispensing head of claim 51, wherein said angle α is an obtuse angle.*

*54. A dispensing head of claim 51, wherein said main portion of said cutout has the shape of a circular arc.*

*55. A dispensing head of claim 49, wherein said fixed portion is formed by a cylindrical ring.*

*56. A dispensing head of claim 49, wherein said fixed part and said movable part are made of one piece.*

*57. A dispensing head of claim 49, wherein said hinge includes a film hinge.*

*58. A dispensing head of claim 49, wherein said hinge passes through a plane defined by said axis of said dispensing valve and said dispensing opening.*

*59. A dispensing head of claim 50, wherein said main portion of said cutout is located in a second plane that is located below and parallel to said first plane.*

*60. A dispensing head of claim 50, wherein said end branches portions are two opposite slanted sides of a trapezoid having a short side that lies in said first plane.*

*61. A dispensing head for a dispenser having a reservoir and a dispensing valve that has a longitudinal axis, the dispensing head comprising:*

*a fixed part;*

*a movable part spaced from said fixed part by a cutout;*

*a hinge pivotally coupling said fixed part to said movable part;*

*a dispensing passageway in said movable part, said dispensing passageway having a dispensing opening and an interior opening, the interior opening being adapted to receive the dispensing valve of the dispenser to permit operation of the dispensing valve upon movement of said moveable part about said hinge, and*

*wherein at least a substantial portion of said cutout lies below a first plane that is both perpendicular to the longitudinal axis of said dispensing valve when said dispensing head is connected to said valve and passes through said hinge, said cutout has a non-linear profile when viewed from a side of said hinge, and wherein the position of the top of said dispensing valve substantially corresponds with the position of said first plane when said dispensing valve is connected to said dispensing head.*

*62. A dispensing head according to claim 61, wherein said cutout has a main portion located below said first plane and said cutout has two end branches, one of the end branches being located at either end of said main portion on opposite sides of said hinge, the end branches being inclined from said main portion upward toward said first plane.*

*63. A dispensing head according to claim 62, wherein an angle α is formed between each end branch and said main portion of said cutout.*

*64. A dispensing head of claim 63, wherein said angle α is from 70 degrees to 160 degrees.*

*65. A dispensing head of claim 63, wherein said angle α is an obtuse angle.*

*66. A dispensing head of claim 63, wherein said main portion of said cutout has the shape of a circular arc.*

*67. A dispensing head of claim 61, wherein said fixed portion is formed by a cylindrical ring.*

*68. A dispensing head of claim 61, wherein said fixed part and said movable part are made of one piece.*

*69. A dispensing head of claim 61, wherein said hinge includes a film hinge.*

*70. A dispensing head of claim 61, wherein said hinge passes through a plane defined by said axis of said dispensing valve and said dispensing opening.*

*71. A dispensing head of claim 62, wherein said main portion of said cutout is located in a second plane that is located below and parallel to said first plane.*

*72. A dispensing head of claim 62, wherein said branch portions are two opposite slanted sides of a trapezoid having a short side that lies in said first plane.*

* * * * *

UNITED STATES PATENT AND TRADEMARK OFFICE

CERTIFICATE OF CORRECTION

PATENT NO. : RE 38,022 E
DATED : March 11, 2003
INVENTOR(S) : Vincent de Laforcade It is certified that error appears in the above-identified patent and that said Letters Patent is hereby corrected as shown below:

Title page,
Item [75], Inventor, change "Vincent De Laforcade" to -- Vincent de Laforcade --.
Item [57], ABSTRACT,
Line 1, change "of liquid" to -- of a liquid --.

Column 6,
Line 43, change "fixed part (1)" to -- fixed part (10) --.

Column 9,
Line 49, delete "portions".

Signed and Sealed this

Twenty-fifth Day of November, 2003

JAMES E. ROGAN
*Director of the United States Patent and Trademark Office*